(12) United States Patent
Cheng et al.

(10) Patent No.: US 7,447,000 B2
(45) Date of Patent: Nov. 4, 2008

(54) SOLID ELECTROLYTIC CAPACITOR AND LEAD FRAME THEREOF

(75) Inventors: Cheng-Liang Cheng, Hsinchu (TW); Kuo-Ching Cheng, Taichung County (TW); Yi-Hsiu Pan, Nantou County (TW); Bang-Hao Wu, Kaohsiung (TW); Li-Duan Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/766,802

(22) Filed: Jun. 22, 2007

(65) Prior Publication Data

US 2008/0158782 A1 Jul. 3, 2008

(30) Foreign Application Priority Data

Dec. 29, 2006 (TW) .............. 95149992 A (51) Int. Cl.
*H01G 4/228* (2006.01)
*H01G 9/00* (2006.01)
*H01G 9/145* (2006.01)

(52) U.S. Cl. .............. 361/540; 361/528; 361/532

(58) Field of Classification Search ............. 361/533, 361/540, 528, 532
See application file for complete search history.

(56) References Cited

U.S. PATENT DOCUMENTS

| | | | | |
|---|---|---|---|---|
| 6,343,004 | B1 * | 1/2002 | Kuranuki et al. | 361/523 |
| 6,493,214 | B1 * | 12/2002 | Kanetake et al. | 361/531 |
| 6,522,527 | B2 * | 2/2003 | Kojima et al. | 361/523 |
| 7,016,179 | B2 * | 3/2006 | Ando | 361/523 |
| 7,342,772 | B2 * | 3/2008 | Tadanobu et al. | 361/523 |
| 2006/0262490 | A1 * | 11/2006 | Saitou et al. | 361/540 |
| 2007/0019366 | A1 * | 1/2007 | Yamaguchi et al. | 361/540 |

* cited by examiner

*Primary Examiner*—Eric Thomas
(74) *Attorney, Agent, or Firm*—Jianq Chyun IP Office (57) ABSTRACT

A solid electrolytic capacitor having multiple capacitor elements and a lead frame is provided. Each capacitor element includes an anode part, a cathode part, an insulating part and at least one first slit. The cathode part is disposed opposite to the anode part. The insulating part is disposed between the anode part and the cathode part. The first slit is disposed at the anode part. The lead frame has an upper surface and a lower surface where the capacitor elements are stacked on. The lead frame includes an anode terminal part electrically connected to the anode part, and includes a cathode terminal part electrically connected to the cathode part. Specially, the anode terminal part includes at least one first projecting part, which projects toward the upper surface. The capacitor elements are stacked on the upper surface and the first slit is inserted into the first projecting part.

26 Claims, 9 Drawing Sheets

SOLID ELECTROLYTIC CAPACITOR AND LEAD FRAME THEREOF

CROSS-REFERENCE TO RELATED APPLICATION

This application claims the priority benefit of Taiwan application serial no. 95149992, filed Dec. 29, 2006. All disclosure of the Taiwan application is incorporated herein by reference.

BACKGROUND OF THE INVENTION

1. Field of the Invention

The present invention generally relates to a solid electrolytic capacitor, in particular, to a solid electrolytic capacitor having a lead frame that can easily orient capacitor elements and a lower equivalent series resistance.

2. Description of Related Art

Because solid electrolytic capacitor has the advantages of small size, large capacitance and good frequency characteristic, it can be used as a decoupling element in the power circuit of a central processing unit (CPU). In general, a plurality of capacitor elements is stacked together to form a solid electrolytic capacitor with a high capacitance.

Figure 1:
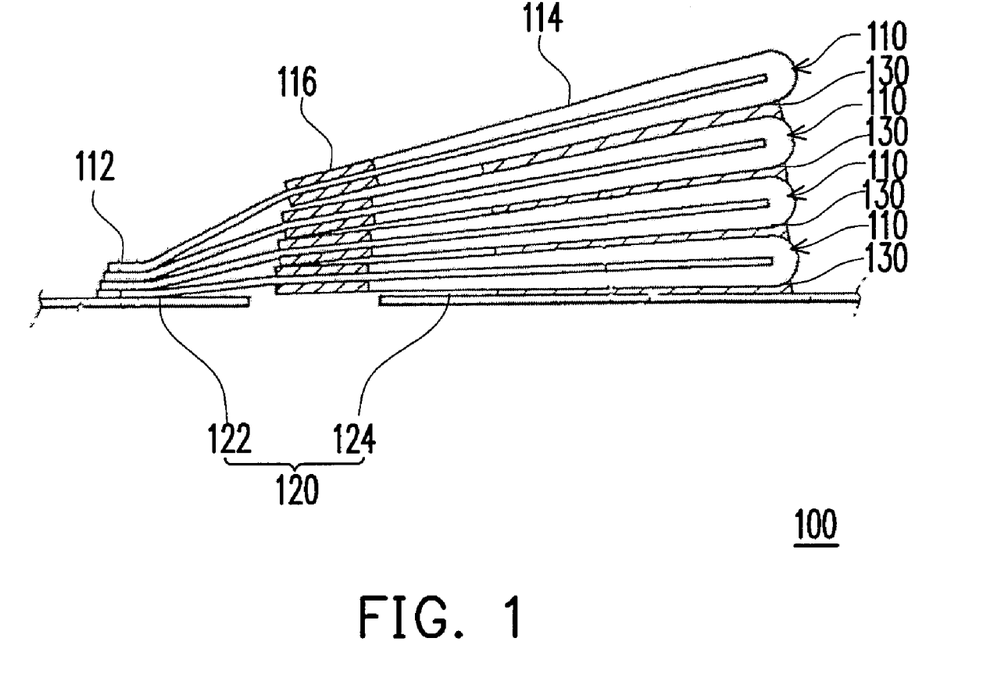
FIG. 1 is a schematic cross-sectional view of a conventional solid electrolytic capacitor.

FIG. 1 is a schematic cross-sectional view of a conventional solid electrolytic capacitor. Referring to FIG. 1, the solid electrolytic capacitor 100 includes a plurality of capacitor elements 110 and a lead frame 120. Each capacitor element 110 includes an anode part 112, a cathode part 114 and an insulating part 116. The insulating part 116 electrically insulates the anode part 112 and the cathode part 114 from each other. More specifically, the cathode parts 114 of the capacitor elements 110 are stacked over one another. Furthermore, conductive layers 130 are disposed between adjacent capacitor elements 110 so that the capacitor elements 110 are electrically connected to one another.

Referring to FIG. 1 again, the lead frame 120 has an anode terminal part 122 and a cathode terminal part 124. The anode parts 112 of the capacitor elements 110 are electrically connected to the anode terminal part 122 while the cathode parts 114 of the capacitor elements 110 are electrically connected to the cathode terminal part 124.

In the solid electrolytic capacitor 100 shown in FIG. 1, the capacitor elements 110 are connected through the conductive layers 130. Therefore, in the process of stacking the capacitor elements 110, accurately aligning each capacitor element 110 is a problem and leads to a low process yield of the solid electrolytic capacitor 100. Moreover, the following problems are often encountered in welding several anode parts 112 of a conventional solid electrolytic capacitor 100.

Figure 2:
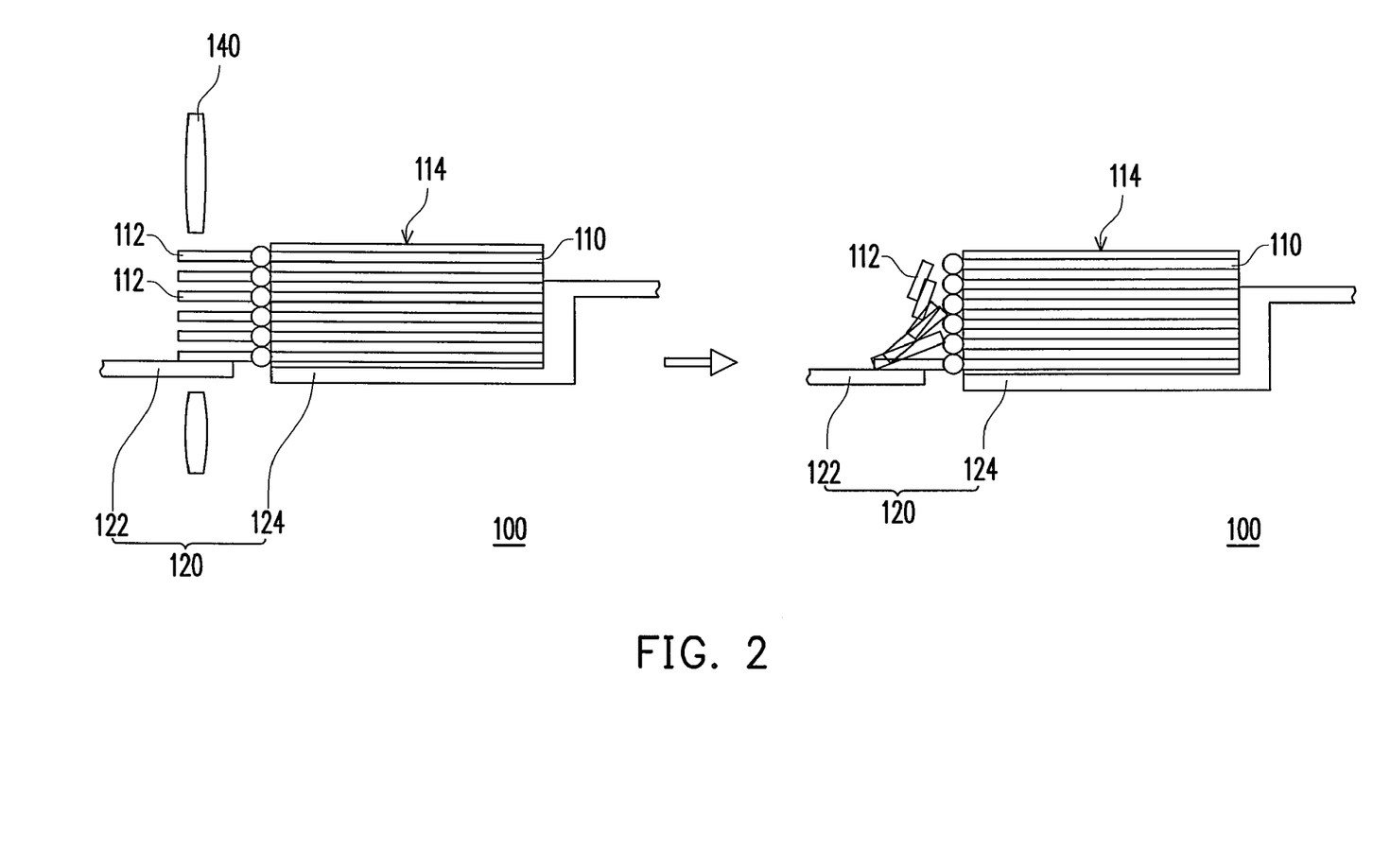
FIG. 2 is a schematic cross-sectional view showing a conventional process of welding the anode parts of a stack of capacitor elements together.
Figure 3:
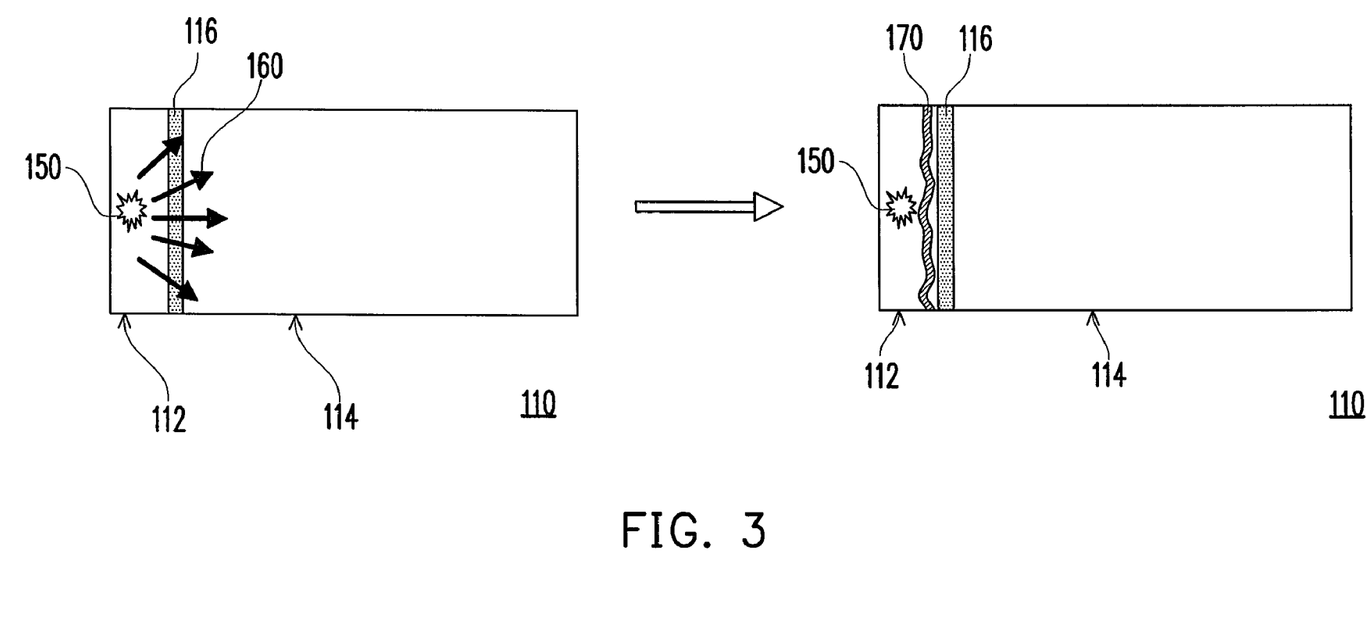
FIG. 3 is a top view showing a conventional process of welding the anode parts of a stack of capacitor elements together.

FIG. 2 is a schematic cross-sectional view showing a conventional process of welding several anode parts of a stack of capacitor elements. FIG. 3 is a top view showing a conventional process of welding the anode parts of a stack of capacitor elements together. Referring to FIG. 2 and FIG. 3, a spot welding apparatus 140 is used to weld the anode parts 112 together after the capacitor elements 110 are stacked over one another. After the spot welding apparatus 140 has applied a stress 160 to a welding spot 150, the stress 160 will spread out. Because the anode parts 112 and the cathode parts 114 have different thickness, uneven stress distribution between the anode parts 112 and the cathode parts 114 may develop and ultimately may lead to the generation of a crack 170. Consequently, the process yield of the process of welding the anode parts 112 together is decreased.

SUMMARY OF THE INVENTION

Accordingly, the present invention is directed to a solid electrolytic capacitor having high orientation precision and process yield and low equivalent series resistance.

The present invention is also directed to a lead frame capable of carrying a plurality of capacitor elements and orienting the capacitor elements with high precision.

According to an embodiment of the present invention, a solid electrolytic capacitor including a plurality of capacitor elements and a lead frame is provided. Each capacitor element includes an anode part, a cathode part, an insulating part and at least a first slit. The cathode part is disposed opposite to the anode part. The insulating part is disposed between the anode part and the cathode part. The first slit is disposed at the anode part. The lead frame has an upper surface and a lower surface. The capacitor elements are stacked on the lead frame. The lead frame includes an anode terminal part and a cathode terminal part. The anode terminal part is electrically connected to the anode part. The anode terminal part includes at least one first projecting part, which projects toward the upper surface. The capacitor elements are stacked on the upper surface. The first projecting part is inserted into the first slit. The cathode terminal part is electrically connected to the cathode part.

According to the above, the present invention also provides a lead frame suitable for carrying a plurality of capacitor elements. Each capacitor element includes an anode part, a cathode part opposite to the cathode part, an insulating part disposed between the anode part and the cathode part and at least one first slit disposed at the anode part. The lead frame has an upper surface and a lower surface. Furthermore, the capacitor elements are stacked on the lead frame. The lead frame includes an anode terminal part and a cathode terminal part. The anode terminal part is electrically connected to the anode part. The anode terminal part includes at least one first projecting part, which projects toward the upper surface. The capacitor elements are stacked on the upper surface. The first slit is inserted into the first projecting part. The cathode terminal part is electrically connected to the cathode part.

In the present invention, at least one first projecting part is disposed on the lead frame and a first slit is disposed at the anode part of the capacitor elements. Therefore, alignment precision when stacking the capacitor elements together is improved and the process of stacking the capacitor elements is simplified. Furthermore, by melting the first projecting part, the anode parts of a plurality of capacitor elements can be easily welded together. In addition, because the first projecting part is embedded in the anode parts of the capacitor elements and the side plates of the cathode terminal part contact with the cathode parts of the capacitor elements, the equivalent series resistance of the solid electrolytic capacitor can be effectively reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 4:
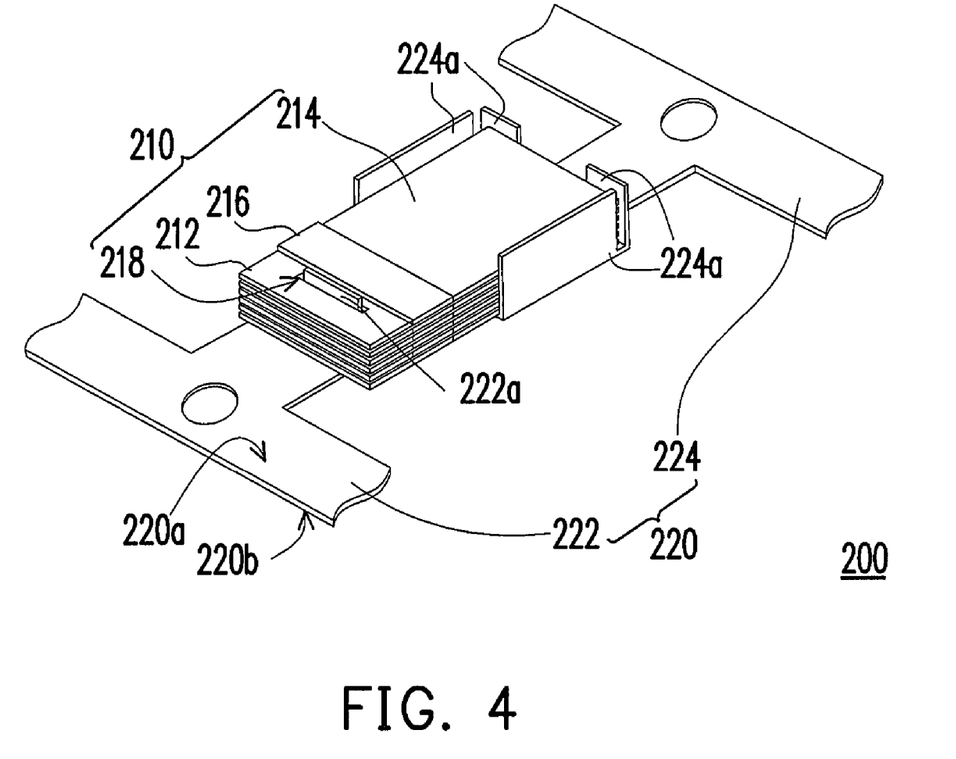
FIG. 4 is a perspective view of a solid electrolytic capacitor according to a preferred embodiment of the present invention.

FIG. 4 is a perspective view of a solid electrolytic capacitor according to a preferred embodiment of the present invention. Referring to FIG. 4, the solid electrolytic capacitor 200 includes a plurality of capacitor elements 210 and a lead frame 220. Each capacitor element 210 includes an anode part 212, a cathode part 214, an insulating part 216 and at least one first slit 218. The cathode part 214 is disposed opposite to the anode part 212. The insulating part 216 is disposed between the anode part 212 and the cathode part 214. The first slit 218 is disposed at the anode part 212. The lead frame 220 has an upper surface 220a and a lower surface 220b. The capacitor elements 210 are stacked on the lead frame 220. The lead frame 220 includes an anode terminal part 222 and a cathode terminal part 224. The anode terminal part 222 is electrically connected to the anode parts 212. The anode terminal part 222 includes at least one first projecting part 222a, which projects toward the upper surface 220a. The capacitor elements 210 are stacked on the upper surface 220a. Furthermore, the first projecting part 222a is inserted into the first slit 218. The cathode terminal part 224 is electrically connected to the cathode parts 214.

As shown in FIG. 4, the first projecting part 222a is disposed on the anode terminal part 222 of the lead frame 220 and the first slit 218 is disposed on the anode parts 212 of the capacitor elements 210. Therefore, each capacitor element 210 can be accurately aligned and stacked so as to increase the process yield of the solid electrolytic capacitor 200. Furthermore, the procedure of fabricating the solid electrolytic capacitor 200 can also be simplified by inserting the first slits 218 into the first projecting part 222a.

To specify the characteristics of the lead frame, a plurality of examples is provided in the present invention to illustrate possible designs of the lead frame. FIGS. 5 to 8 are perspective views of lead frames according to preferred embodiments of the present invention.

Figure 5:
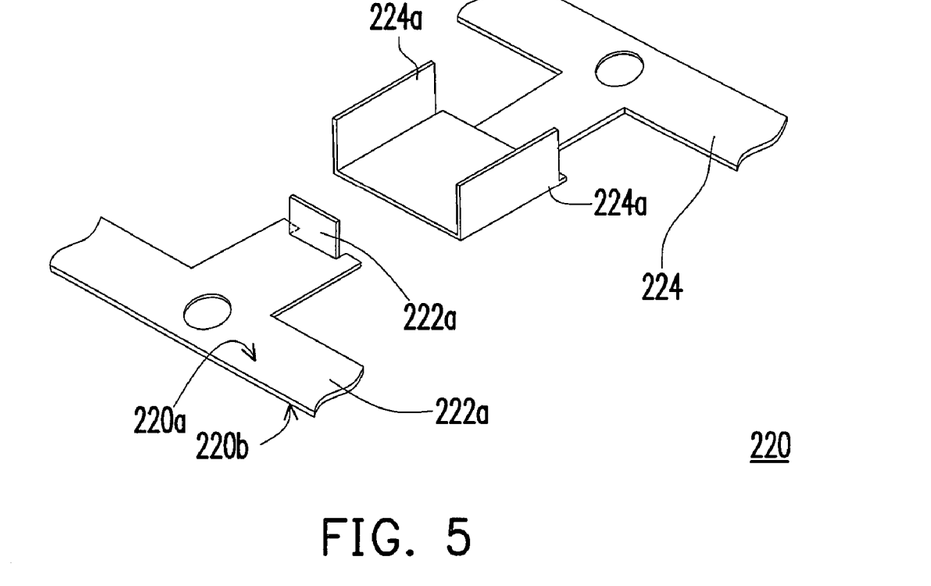
FIGS. 5 to 8 are perspective views of lead frames according to preferred embodiments of the present invention.

Referring to FIG. 4 and FIG. 5, the lead frame 220 is suitable for carrying a plurality of capacitor elements 210. Each capacitor element 210 includes an anode part 212, a cathode part 214 disposed opposite to the anode part 212, an insulating part 216 disposed between the anode part 212 and the cathode part 214, and at lease one first slit 218 disposed on the anode part 212. The lead frame 220 has an upper surface 220a and a lower surface 220b. Furthermore, the capacitor elements 210 are stacked on the lead frame 220. The lead frame 220 also includes an anode terminal part 222 and a cathode terminal part 224. The anode terminal part 222 is electrically connected to the anode parts 212 and includes at least one first projecting part 222a. The first projecting part 222a projects toward the upper surface 220a. The capacitor elements 210 are stacked on the upper surface 220a and the first slits 218 are inserted into the first projecting part 222a. The cathode terminal part 224 is electrically connected to the cathode parts 214.

Figure 6:
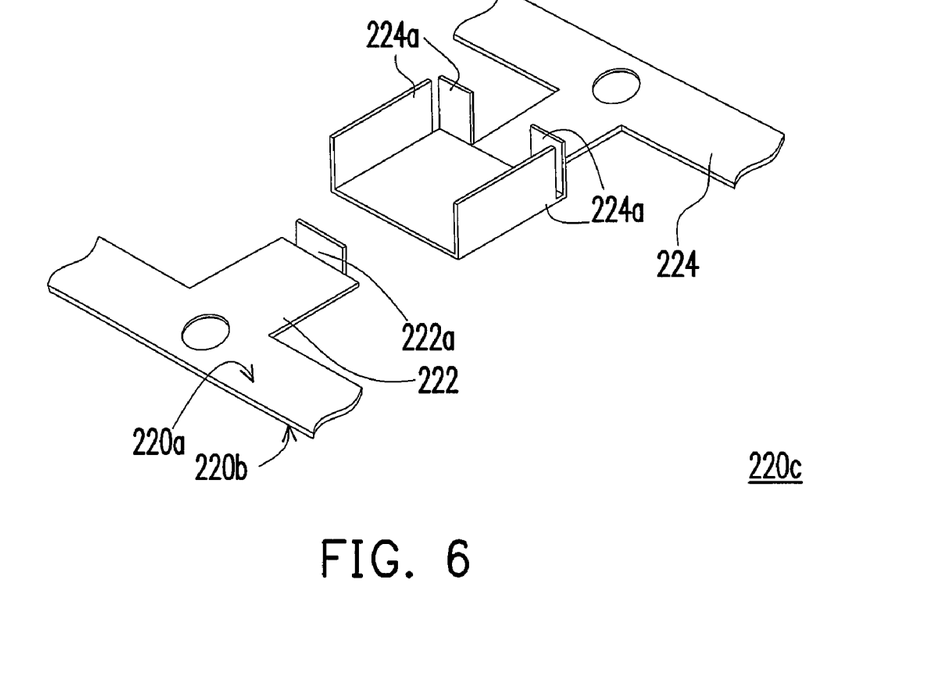

Referring to FIG. 5 and FIG. 6, it should be noted that the first projecting part 222a and the anode terminal part 222 of the lead frame 220 in FIG. 5 can be formed as a single unit. In other words, the first projecting part 222a can be formed through bending part of the anode terminal part 222 upward. However, the first projecting part 222a and the anode terminal part 222 can be different components as in the lead frame 220c shown in FIG. 6. In this case, the first projecting part 222a is welded to the anode terminal part 222.

In addition, as shown in FIG. 5 and FIG. 6, the lead frame 220 in an embodiment further includes a plurality of side plates 224a. The side plates 224a are disposed on the side edges of the cathode terminal part 224 and contact the side surfaces of the capacitor elements 210. Furthermore, the side plates 224a can also be disposed on the outlet end and the side edges of the cathode terminal part 224 to form a box-like structure such that the box-like structure is suitable for stacking a plurality of the capacitor elements 210 therein.

Figure 7:
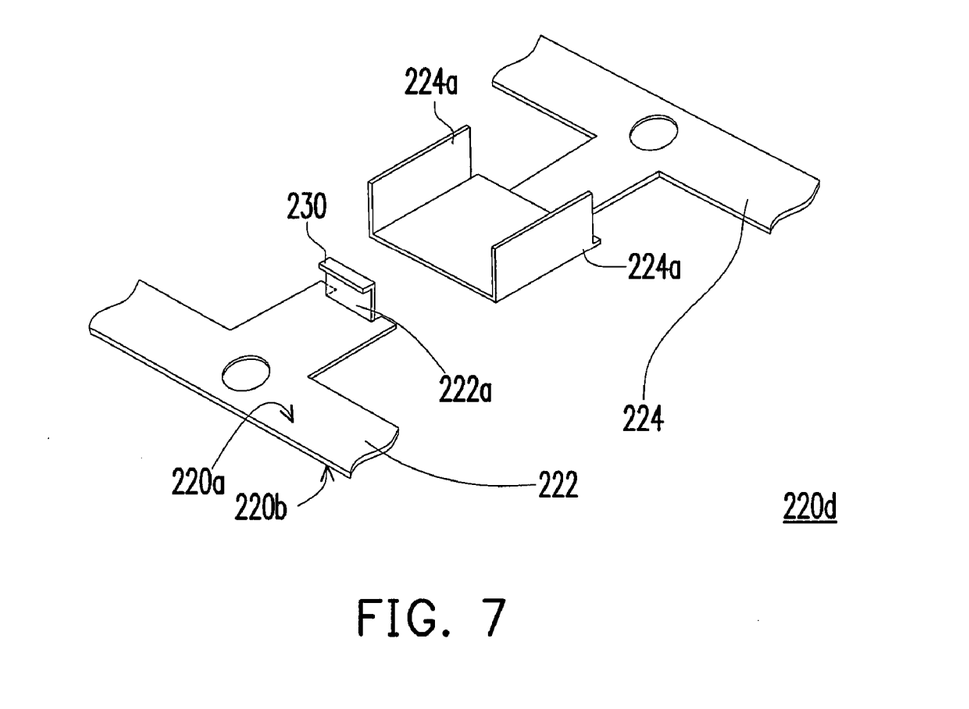

It should be noted that the contact area between the cathode terminal part 224 and the capacitor elements 210 could be substantially increased through the contact between the side plates 224a and the side surfaces of the capacitor elements 210. Therefore, the equivalent series resistance of a solid electrolytic capacitor having this lead frame 220 can be significantly reduced. Furthermore, as long as the spirit is there, the present invention is not intended to limit the side plates 224a to the foregoing disposition. Referring to FIG. 7, the lead frame 220d further includes a bent structure 230 disposed at the top end of the first projecting part 222a of the lead frame 220d. Through the bent structure 230, the capacitor elements 210 on the upper surface 220a of the lead frame 220 are stacked and fixed even better.

Figure 8:
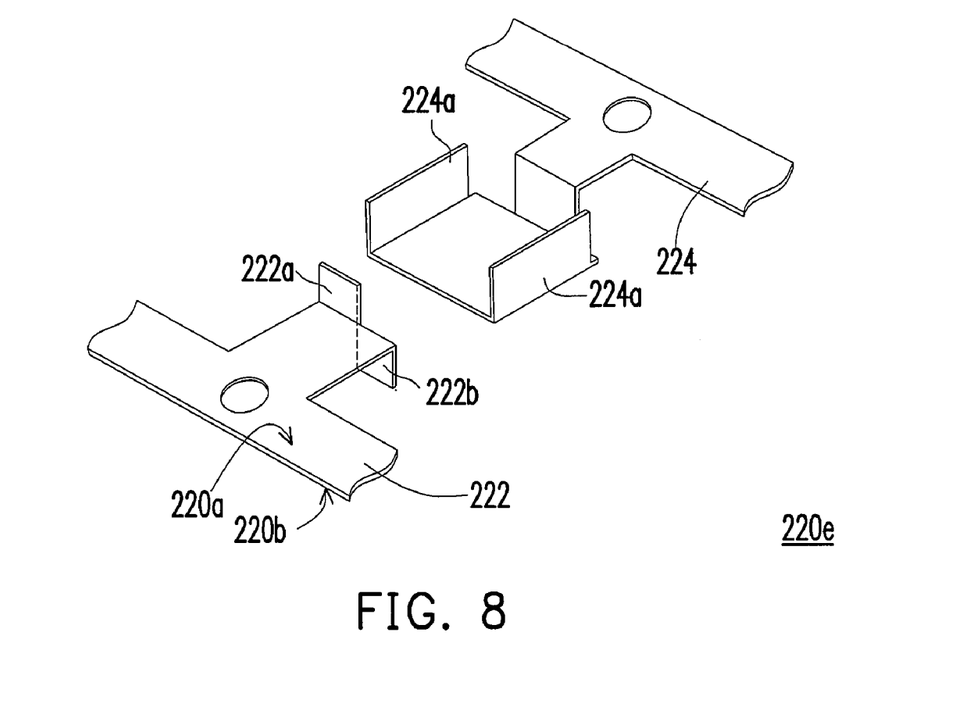

Please referring to FIG. 8, the lead frame 220e may further includes a second projecting part 222b disposed on the anode terminal part 222 of the lead frame 220e and projects toward the lower surface 220b. The capacitor elements 210 are stacked on the lower surface 210b and the first slits 218 are inserted into the second projecting part 222b.

More specifically, the lead frame 220e in FIG. 8 has a first projecting part 222a and a second projecting part 222b. Therefore, capacitor elements 210 having the first slits 218 can be easily inserted into the first projecting part 222a and the second projecting part 222b and stacked on the upper surface 220a and the lower surface 220b of the lead frame 220c, respectively. Similarly, the second projecting part 222b and the anode terminal part 222 can be formed as a single unit or formed as different components but welded together. In addition, a bent structure (not shown) may be disposed at the top end of the second projecting part 222b so as to stack and fix the capacitor element 210 on the lower surface 220b of the lead frame 220e even better.

Figure 9:
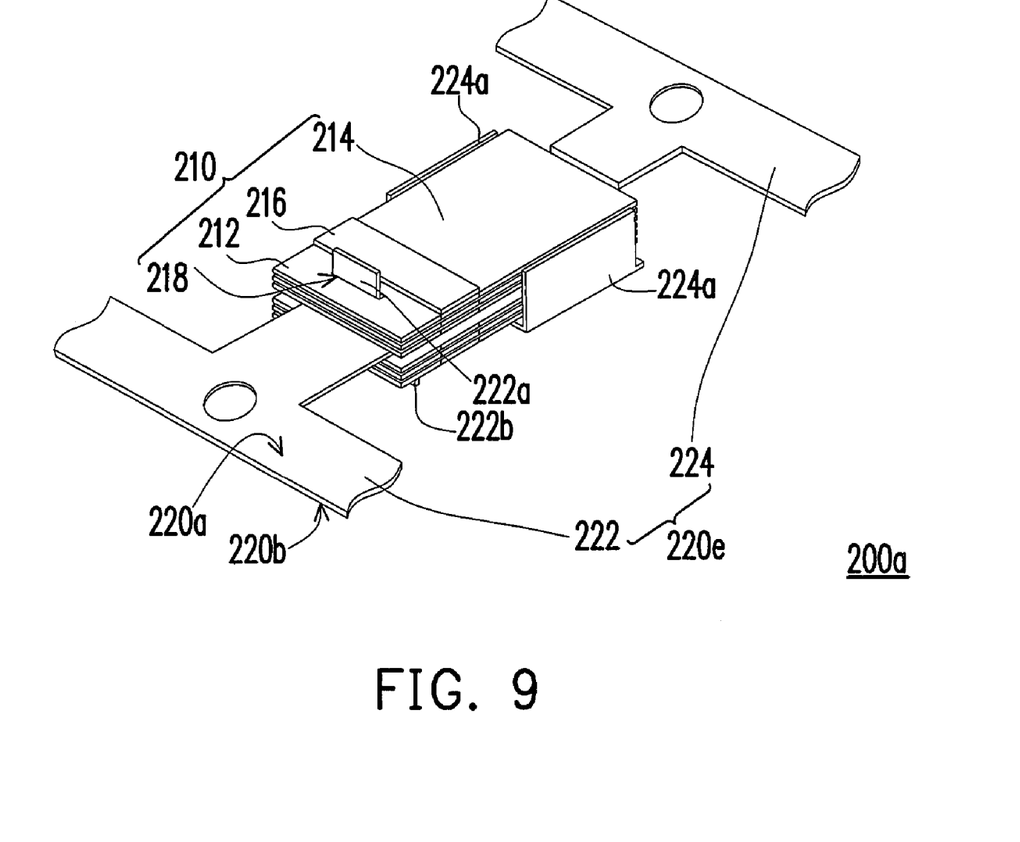
FIG. 9 is a perspective view of another solid electrolytic capacitor according to a preferred embodiment of the present invention.

FIG. 9 is a perspective view of another solid electrolytic capacitor according to a preferred embodiment of the present invention. The solid electrolytic capacitor 200a uses the lead frame 220e shown in FIG. 8. Consequently, the solid electrolytic capacitor 200a is capable of stacking a greater number of capacitor elements 210 and increases the capacitance of the solid electrolytic capacitor 200a.

The lead frames 220, 220c, 220d, 220e in FIG. 5~FIG. 8 may further include a plated layer (not shown) coated on the first projecting part 222a. The material of the plated layer can be tin or tin alloy. Similarly, a plated layer may be coated on the second projecting part 220b. The plated layer is a low melting point material.

After the first slits of the capacitor elements 210 are inserted into the first projecting part 222a or the second projecting part 222b, the plated layer on the first projecting part 222a or the second projecting part 222b can be melted by simply heating the first projecting part 222a or the second projecting part 222b. Therefore, the anode part 212 of each capacitor element 210 can be easily welded together and the capacitor elements 210 are electrically connected to one another through the plated layer. On the other hand, the anode parts 212 can also be electrically connected together by filling the first slits 218 with silver paste or performing a laser welding operation. However, the present invention is not intended to limit methods of electrically connecting several anode parts 212.

Referring to FIG. 4 and FIG. 9, the solid electrolytic capacitors 200 and 200a may further include an encapsulant (not shown) encapsulating the capacitor elements 210 and part of the lead frames 220 and 220e for better protection of the electrolytic capacitors 200 and 200a. Obviously, the encapsulant can be used to package a solid electrolytic capacitor having any one of the aforementioned lead frames 220, 220c, 220d and 220e. In general, the material of the encapsulant is epoxy resin. However, the present invention is not intended to limit the kinds of encapsulant material.

Accordingly, utilizing the designs of the first projecting part 222a, the second projecting part 222b, the first slits 218 and the plated layer, the precision of orienting the stacked capacitor elements 210 is improved, the procedure for fabricating the stacked capacitor elements 210 is simplified, the equivalent series resistance of the solid electrolytic capacitors 200 and 200a is reduced, and the welding of the anode parts 212 of the capacitor elements 210 is easier to perform.

Figure 10:
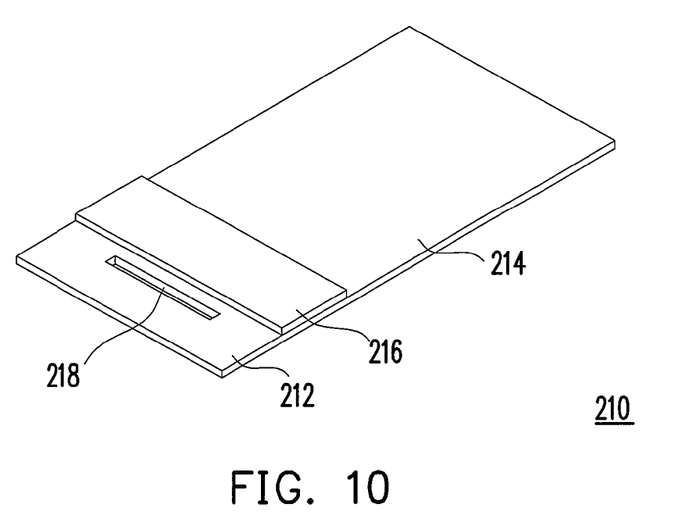
FIG. 10 is a perspective view of a capacitor element according to a preferred embodiment of the present invention.

FIG. 10 is a perspective view of a capacitor element according to a preferred embodiment of the present invention. As shown in FIG. 10, each capacitor element 210 of the foregoing solid electrolytic capacitor 200 and 200a includes an anode part 212, a cathode part 214, an insulating part 216 and a first slit 218.

In general, the cathode part 214 includes a valve metal layer (not shown), a dielectric layer (not shown), a solid electrolyte layer (not shown) and a conductive layer (not shown). The dielectric layer is formed on the valve metal layer. The solid electrolyte layer is formed on the dielectric layer. The conductive layer is formed on the solid electrolyte layer.

The valve metal layer is fabricated using a metal such as aluminum, tantalum, titanium or niobium or an alloy thereof. The dielectric layer is an oxide layer of the metal of the valve metal layer. For example, if aluminum is used as the material of the valve metal layer, the dielectric layer is made of aluminum oxide. Obviously, other kinds of dielectric material can be used to form the dielectric layer. The solid electrolyte layer is a conductive polymer capable of generating a capacitance. The conductive layer is mix colloid of silver and carbon, or a two-layer structure of carbon and silver. The foregoing description regarding the materials of each layers is used as an example only. Anyone skilled in the art may notice that the materials of the film layers can be changed and the present invention is not intended to limit the materials of the layers.

It should be noted that the cracks 170 formed when the anode parts 212 are being welded together in a conventional process (as shown in FIG. 2 and FIG. 3) could be avoided by suitably modifying the method of disposing the slits 218 in another embodiment of the present invention.

Figure 11A:
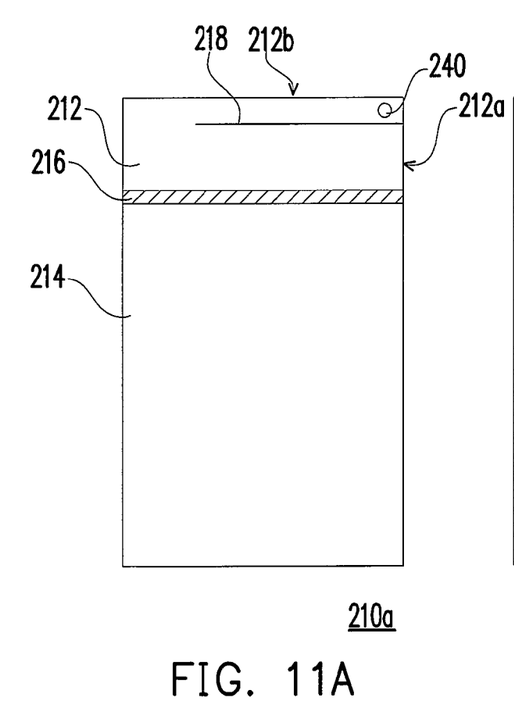
FIGS. 11A and 11B are top views of a capacitor element according to a preferred embodiment of the present invention.
Figure 11B:
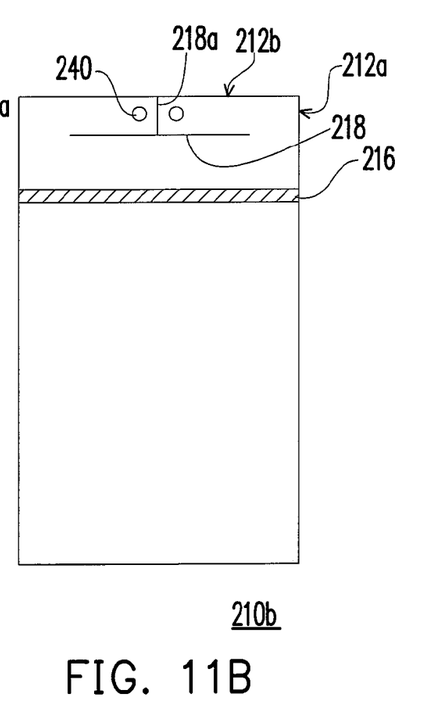

FIG. 11A and FIG. 11B are top views of a capacitor element according to a preferred embodiment of the present invention. In one embodiment as shown in FIG. 11A, one end of the first slit 218 of the capacitor element 210a stretches to one side edge 212a of the anode part 212. Moreover, the capacitor element 210a further includes a welding spot 240 disposed on the anode part 212 and located between the first slit 218 and the top edge 212b of the anode part 212.

In another embodiment as shown in FIG. 11B, the capacitor element 210b may further include a second slit 218a located near the central part of the anode part 212. Moreover, the second slit 218a stretches from the top edge 212b of the anode part 212 toward the first slit 218 and connects with the first slit 218. The capacitor element 210b further includes at least one welding spot 240 disposed on the anode part 212 and located at the intersection between the first slit 218 and the second slit 218a. Furthermore, the aforementioned first slit 218 and second slit 218a can be a hole or similar structure and is not limited to a slit structure.

Figure 12:
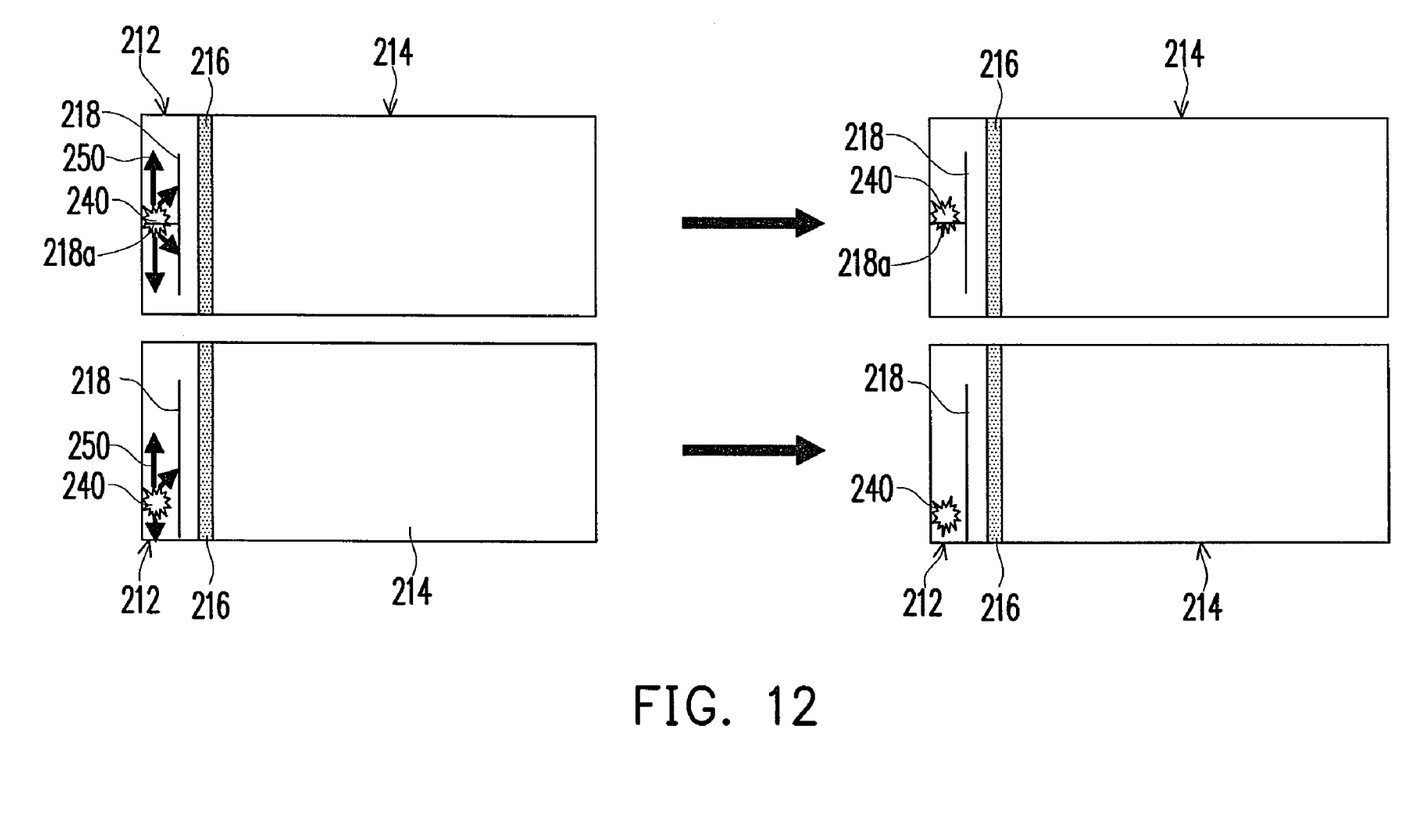
FIG. 12 is a top view showing the process of welding together the anode parts of stacked capacitor elements according to a preferred embodiment of the present invention.

FIG. 12 is a top view showing the process of welding together the anode parts of stacked capacitor elements according to a preferred embodiment of the present invention. Referring to FIGS. 11A and 12, when a welding of the anode part 212 is performed through the welding spot 240 on the capacitor element 210a, the stress 250 applied to perform the welding is blocked by the first slit 218 and prevented from transmitting to the cathode part 214 since the first slit 218 stretches from the side edge 212a of the anode part 212 to the interior of the anode part 212. As a result, none of the aforementioned cracks 170 of the conventional process is formed and the process yield of the present invention is increased.

Similarly, referring to FIGS. 11B and 12, when a welding is performed through the welding spot 240 of the capacitor element 210b, the stress 250 applied to perform the welding is blocked by the first slit 218 and the second slit 218a since the welding spot 240 is disposed at the intersection between the first slit 218 and the second slit 218a. Consequently, the stress 250 is prevented from transmitting to the cathode part 214 and none of the aforementioned cracks 170 of the conventional process is formed. Therefore, the process yield is increased.

In summary, the solid electrolytic capacitor and lead frame of the present invention has the following advantages:

1. The design of having at least one projecting part in the lead frame and a first slit in the anode parts of the capacitor elements can increase the precision of orienting the stack of capacitor elements, simplify the process of stacking the capacitor elements and ease the adjustment of the number of capacitor elements in the stack.

2. By melting the plated layer coated on the first projecting part or filling the first slits with Ag paste, the anode parts of a plurality of capacitor elements can be easily welded together.

3. Because the first projecting part is embedded in the anode parts of the capacitor elements and the side plates of the cathode terminal part contact the cathode parts of the capacitor elements, the equivalent series resistance of the solid electrolytic capacitor is effectively reduced.

4. The design of having a first slit and a second slit in the capacitor elements can prevent cracks from forming on the anode parts when a welding of the anode parts is being performed. As a result, the process yield is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A solid electrolytic capacitor, comprising:
    a plurality of capacitor elements, each capacitor element comprising:
        an anode part;
        a cathode part, disposed opposite to the anode part;
        an insulating part, disposed between the anode part and the cathode part;
        at least one first slit, disposed on the anode part;
    a lead frame, having an upper surface and a lower surface and the capacitor elements stacked on the lead frame, the lead frame comprising:
        an anode terminal part, electrically connected to the anode parts and comprising at least one projecting part projecting toward the upper surface, wherein the capacitor elements are stacked on the upper surface and the first slits are inserted into the first projecting part; and
        a cathode terminal part, electrically connected to the cathode parts.

2. The solid electrolytic capacitor according to claim 1, further comprising a bent structure disposed at a top end of the first projecting part.

3. The solid electrolytic capacitor according to claim 1, further comprising a plated layer coated on the first projecting part.

4. The solid electrolytic capacitor according to claim 1, wherein the first projecting part and the anode terminal part are formed together as a single unit.

5. The solid electrolytic capacitor according to claim 1, further comprising a second projecting part disposed on the anode terminal part and projecting toward the lower surface, wherein the capacitor elements are stacked on the lower surface and the first slits are inserted into the second projecting part.

6. The solid electrolytic capacitor according to claim 5, further comprising a bent structure disposed at a top end of the second projecting part.

7. The solid electrolytic capacitor according to claim 5, further comprising a plated layer coated on the second projecting part.

8. The solid electrolytic capacitor according to claim 5, wherein the second projecting part and the anode terminal part are formed together as a single unit.

9. The solid electrolytic capacitor according to claim 1, further comprising a plurality of side plates disposed on side edges of the cathode terminal part and contacted side surfaces of the stacked capacitor elements.

10. The solid electrolytic capacitor according to claim 9, wherein the side plates are disposed on outlet end and side edges of the cathode terminal part to form a box-like structure.

11. The solid electrolytic capacitor according to claim 1, wherein one end of each first slit stretches to a side edge of the anode part.

12. The solid electrolytic capacitor according to claim 11, further comprising a welding spot disposed on the anode part and located between the first slit and the top edge of the anode part.

13. The electrolytic capacitor according to claim 1, further comprising a second slit disposed at a central part of the anode part, wherein the second slit stretches from the top edge of the anode part toward the first slit and connects with the first slit.

14. The electrolytic capacitor according to claim 13, further comprising at least one welding spot disposed on the anode part and located at an intersection between the first slit and the second slit.

15. The solid electrolytic capacitor according to claim 1, wherein the cathode part comprises:
    a valve metal layer;
    a dielectric layer, formed on the valve metal layer;
    a solid electrolytic layer, formed on the dielectric layer; and
    a conductive layer, formed on the solid electrolytic layer.

16. The solid electrolytic capacitor according to claim 1, further comprising an encapsulant for encapsulating the capacitor elements and part of the lead frame.

17. A lead frame, suitable for carrying a plurality of capacitor elements, each capacitor element comprising an anode part, a cathode part disposed opposite to the anode part, an insulating part disposed between the anode part and the cathode part, and at least one first slit disposed on the anode part, wherein the lead frame has an upper surface and a lower surface, and the capacitor elements are stacked on the lead frame, the lead frame comprising:
    an anode terminal part, for electrically connecting to the anode parts, wherein the anode terminal part comprises at least one first projecting part projecting toward the upper surface, the capacitor elements are stacked on the upper surface, and the first slits are inserted into the first projecting part; and
    a cathode terminal part, for electrically connecting to the cathode parts.

18. The lead frame according to claim 17, further comprising a bent structure disposed at a top end of the first projecting part.

19. The lead frame according to claim 17, further comprising a plated layer coated on the first projecting part.

20. The lead frame according to claim 17, wherein the first projecting part and the anode terminal part are formed together as a single unit.

21. The lead frame according to claim 17, further comprising a second projecting part disposed on the anode terminal part and projecting toward the lower surface, wherein the capacitor elements are stacked on the lower surface and the first slits are inserted into the second projecting part.

22. The lead frame according to claim 21, further comprising a bent structure disposed at a top end of the second projecting part.

23. The lead frame according to claim 21, further comprising a plated layer coated on the second projecting part.

24. The lead frame according to claim 21, wherein the second projecting part and the anode terminal part are formed together as a single unit.

25. The lead frame according to claim 17, further comprising a plurality of side plates disposed on side edges of the cathode terminal part and contacted side surfaces of the capacitor elements.

26. The lead frame according to claim 25, wherein the side plates are disposed on outlet end and side edges of the cathode terminal part to form a box-like structure.

* * * * *